A. H. NILSON & M. OLSON.
MACHINE FOR MAKING TUBE SECTIONS AND SIMILAR PARTS.
APPLICATION FILED JULY 6, 1908.

912,601.

Patented Feb. 16, 1909.
6 SHEETS—SHEET 6.

UNITED STATES PATENT OFFICE.

AXEL H. NILSON AND MAURITZ OLSON, OF BRIDGEPORT, CONNECTICUT, ASSIGNORS TO R. E. DIETZ COMPANY, OF NEW YORK, N. Y., A CORPORATION OF NEW YORK.

MACHINE FOR MAKING TUBE-SECTIONS AND SIMILAR PARTS.

No. 912,601.      Specification of Letters Patent.      Patented Feb. 16, 1909.

Application filed July 6, 1908. Serial No. 442,005.

*To all whom it may concern:*

Be it known that we, AXEL H. NILSON and MAURITZ OLSON, citizens of the United States, residing at Bridgeport, county of Fairfield, State of Connecticut, have invented a new and useful Machine for Making Tube-Sections and Similar Parts, of which the following is a specification.

This invention has for its object to provide an automatic machine for making tube sections and similar parts from sheet metal, for example, the side tubes of tubular lanterns.

With this and other objects in view the invention consists in certain constructions and in certain parts, improvements and combinations which will be hereinafter described and then specifically pointed out in the claims hereunto appended.

In the accompanying drawings forming a part of this specification, in which like characters of reference indicate the same parts.

20 denotes the bed of the machine, 21 framework which may be of any ordinary or preferred construction and 32 brace rods. Power is applied to drive the machine by means of a belt (not shown) passing over a belt pulley 22 on a shaft 24 which carries a clutch 23, a fly-wheel 25 and a pinion 26 which meshes with a gear wheel 27 on the main shaft 28. The main shaft is provided between the side pieces of the framework with eccentrics having the usual eccentric straps indicated by 29 and eccentric rods 30 which are pivoted to a vertically sliding cross head 31, which carries the male dies indicated by 39, 40 and 41. Outside the framework the main shaft is provided with a disk 33 having a cam groove 34, shown only in dotted lines, and with peripheral cams 35 and 36. The main shaft also carries on the other outer side of the framework a disk 37, shown as lying partially within gear wheel 27, which is provided with a cam groove 38, shown only in dotted lines.

Figure 1:
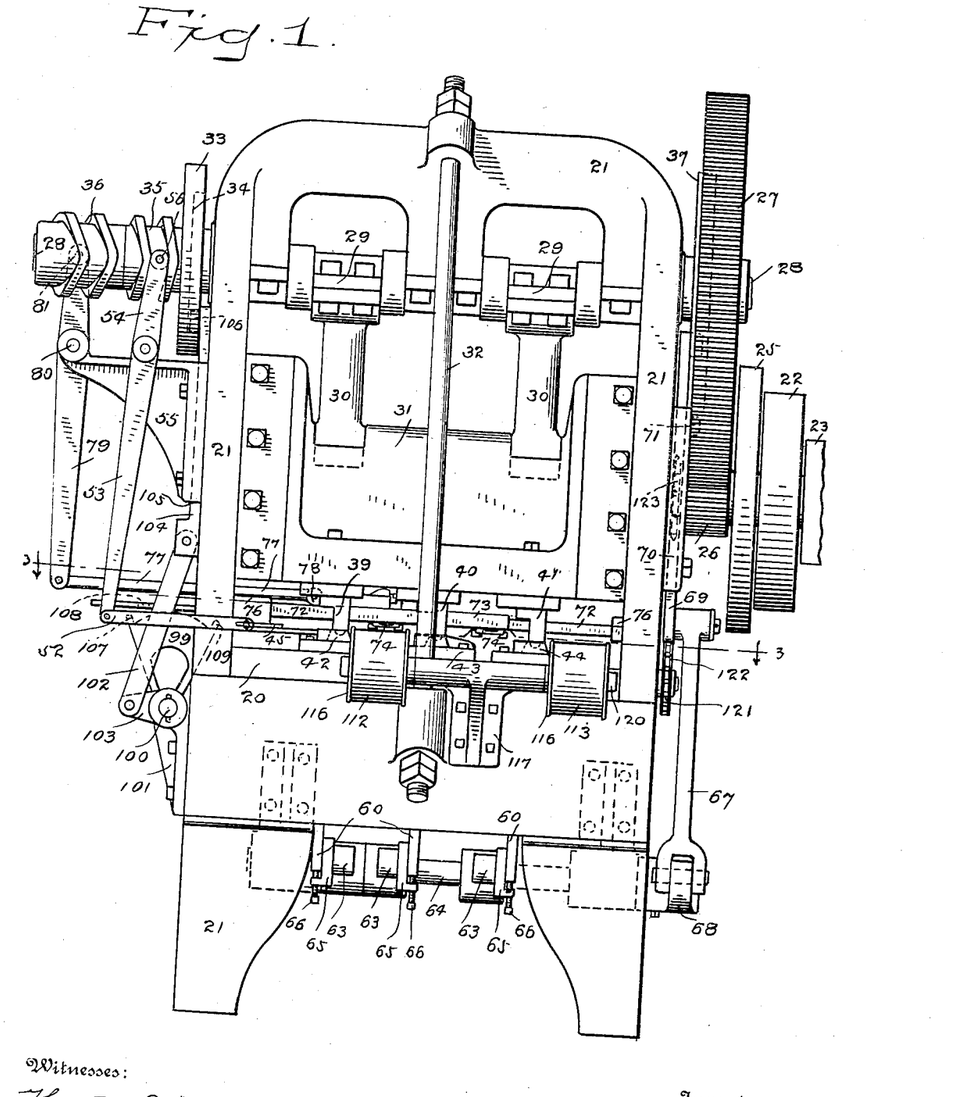
Figure 1 is a front elevation of the machine complete.
Figure 4:
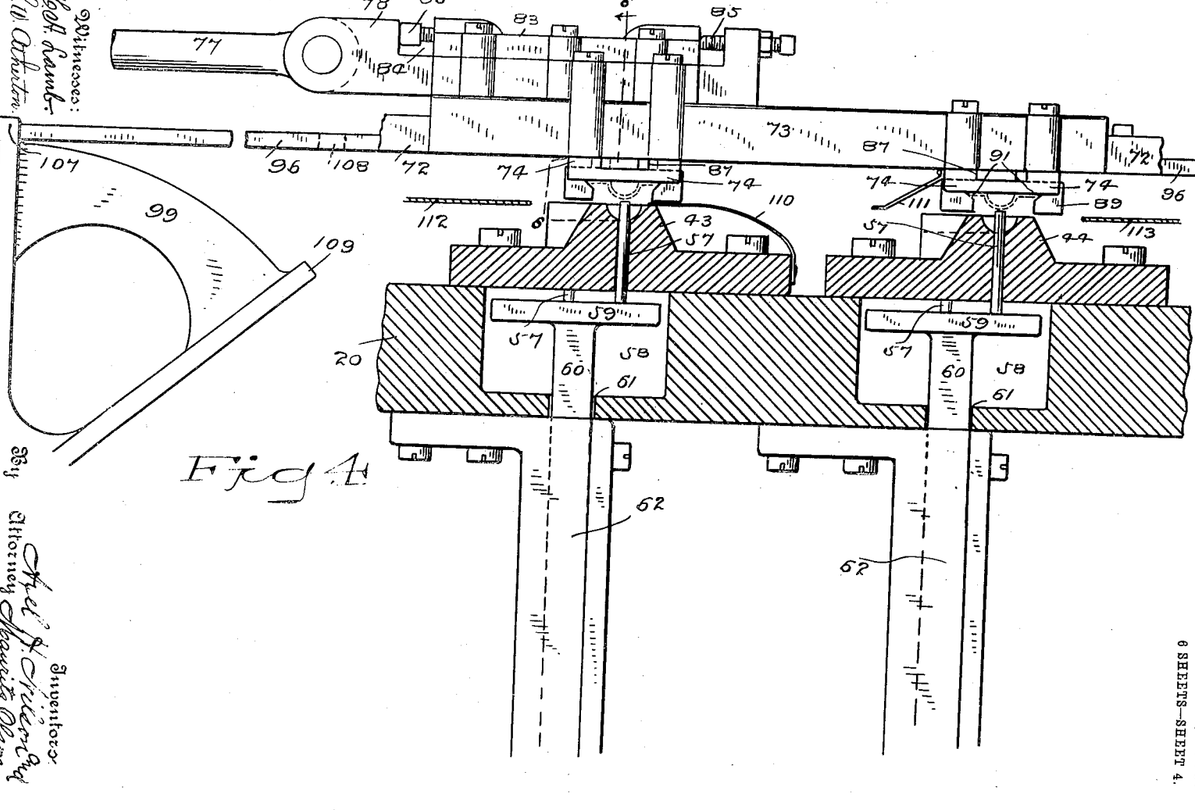
Fig. 4 a vertical section of the female dies on a still larger scale, on the line 4—4 in Fig. 3, the ejecting mechanism operating in connection with the second and third dies appearing in elevation and the grippers being in the gripping position.

42, 43 and 44 denote the female dies which are bolted to the bed (see Fig. 4 in connection with Fig. 1).

Figure 2:
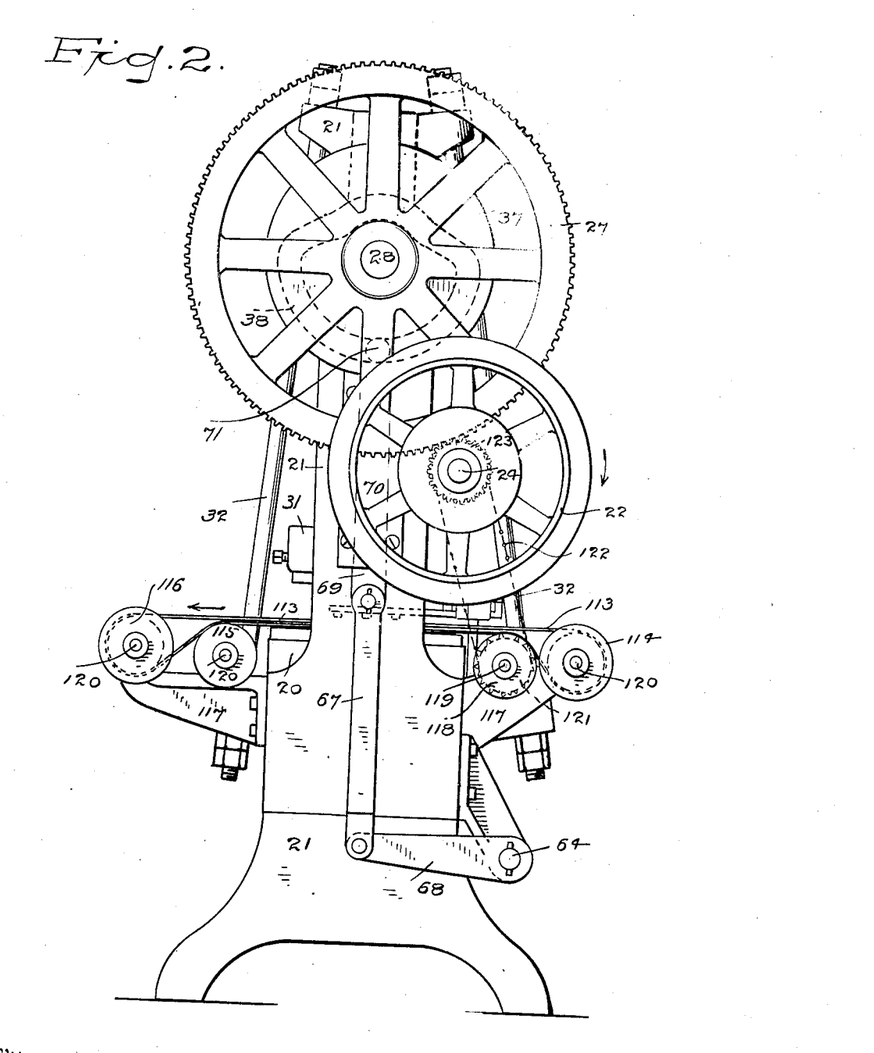
Fig. 2 an end elevation as seen from the right in Fig. 1.
Figure 3:
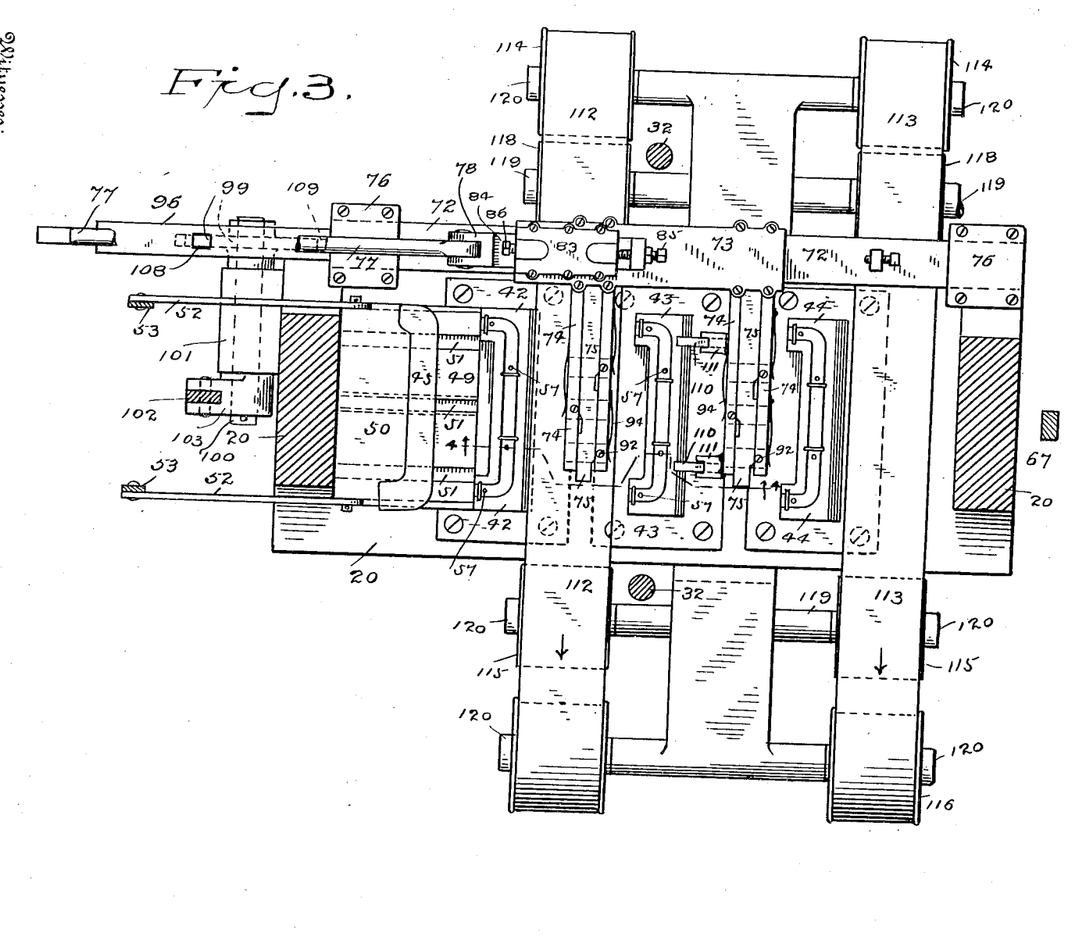
Fig. 3 a horizontal section on an enlarged scale on the line 3—3 in Fig. 1 looking down, the grippers being in an intermediate position.

For convenience in description, we will indicate the blanks furnished to the machine by 45, the parts after the operation of the first dies by 46, after the operation of the second dies by 47 and tube sections as completed by the operation of the third dies by 48. In use, the blanks are placed in proper position upon a receiving plate 49 and are fed to the first dies by means of a feed slide 50. The receiving plate is provided with ways 51, three being shown in the present instance and the center way shown as made dovetailed, which are engaged by ribs on the underside of the feed slide. Reciprocatory motion is imparted to the feed slide by means of links 52 which are pivoted to the opposite sides of the feed slide and to the arms 53 of a lever 54 pivoted to a bracket 55 which is secured to the framework. The upper end of lever 54 is provided with a roller 56 which engages the groove of peripheral cam 35. After the blank has been operated on by each pair of dies, it is ejected therefrom by means of plungers 57, four in the present instance, which slide vertically in the female die of each pair. Underneath each female die is a recess 58 in the bed in which is a vertically reciprocating table 59 carried by a standard 60 which passes through an opening 61 in the bottom of the bed and through guides 62 secured to the underside of the bed. The tables and plungers are raised to eject the partly formed parts by means of arms 63 extending from a rock shaft 64. Arms 63 are provided with L-shaped rests carrying set screws 66 which bear against the lower ends of standards 60 and act to adjust the height of the standards and plungers. The rock shaft is operated by means of a link 67 pivoted to an arm 68, extending from the rock shaft, and to a slide 69 which reciprocates in a housing 70 secured to the framework. The slide is provided with a roller 71 which engages cam groove 38 in disk 37 (see dotted lines in Fig. 2 in connection with Fig. 1). The action of the cam groove, roller, slide, rock shaft and connecting parts is to raise the tables and plungers, to retain them raised for a predetermined time, then to permit them to drop by gravity and remain in the lowered position for a predetermined time, and then to raise them again.

72 denotes a carrying plate which is rigidly secured to the framework in any suitable manner as by plates 76.

73 denotes a carrier which reciprocates over the carrying plate and carries two transverse plates 74 having ways 87 in which the gripper slides 75 reciprocate longitudinally of the ways and transversely to the carrier. Reciprocatory movement is imparted to the carrier on the carrying plate by means of a connecting rod 77 which is pivoted to a driving slide 78 and to a lever 79 fulcrumed on bracket 55, as at 80, and carrying at its upper end a roller 81 which engages the groove in peripheral cam 36 on main shaft 28. The connection of rod 77 to the carrier by means of slide 78 is for purposes of adjustment only. Slide 78 lies in a socket 82 in the carrier and is retained in place by a cap plate 83. The slide is provided with a recess 84 which receives the cap plate and the slide and cap plate are provided with adjusting screws 85 and 86, respectively, which engage the ends of the cap plate and recess, respectively, to adjust the position of the slide relatively to the carrier, as will be clearly understood from Fig. 4.

Figures 5, 6:
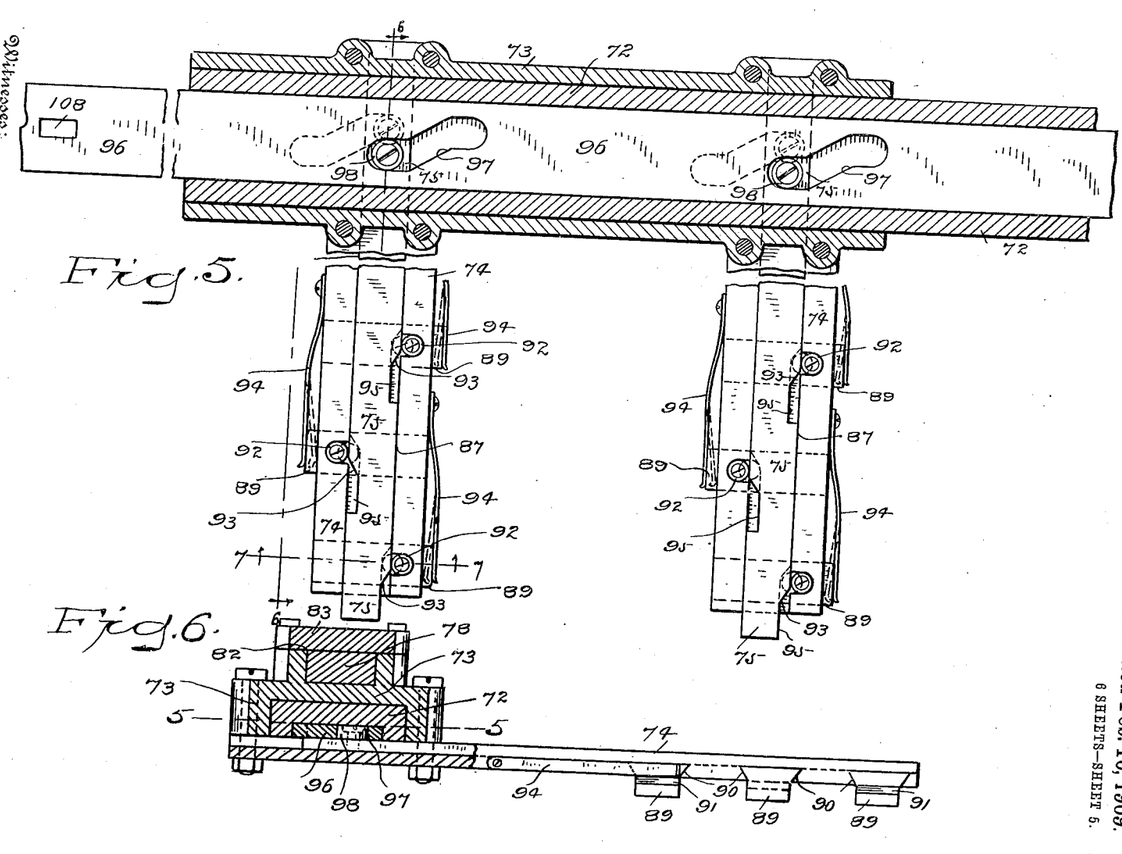
Fig. 5 an enlarged detail view partly in horizontal section showing the mechanism for operating the grippers and the gripper slides, the section line being indicated by 5—5 in Fig. 6.
Fig. 6 a detail view partly in section on the line 6—6 in Figs. 4 and 5.
Figure 7:
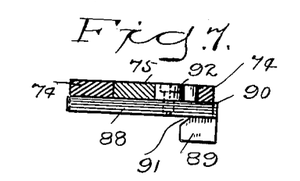
Fig. 7 a detail sectional view of one of the way plates on the line 7—7 in Fig. 5, a gripper appearing in elevation.
Figure 8:
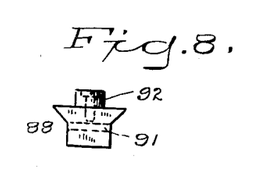
Fig. 8 a view of a gripper detached as seen from the right in Fig. 7.

88 denotes the grippers which reciprocate in transverse ways 90 in way plates 74 and are provided with fingers 89 having recesses 91 which receive the edges of the blanks and partly finished parts, as will be more fully explained. Each way plate is shown as provided with three grippers, one of which moves inward from left to right, as shown in Fig. 5, to engage the central portion of the blank, the other two moving inward from right to left to engage the blanks and parts near the ends. The grippers are moved outward to release the blanks and parts by means of rollers 92 carried by the grippers which engage inclines 93 on gripper slides 75. The grippers are forced inward to grip the blanks and parts for a purpose presently to be explained, by means of springs 94 which are secured to the way plates and which bear upon the ends of the grippers to force them inward, the rollers in the inward position of the grippers lying partially in recesses 95 in the gripper slides. The gripper slides are reciprocated to operate the grippers by means of a gripper operating slide 96 which reciprocates in a way in the underside of carrying plate 72. The gripper operating slide is provided with cam slots or grooves 97 which are engaged by rollers 98 near the inner ends of the gripper slides. The gripper operating slide is carried by the carrier in its reciprocations through the engagement of rollers 98 with the respective ends of cam slots 97, as clearly shown in full and dotted lines in Fig. 5. At the completion of the movement of the carrier in either direction, the gripper operating slide is moved longitudinally independently of the carrier to open or close the grippers as presently will be fully explained. This operation of the gripper operating slide is effected by means of an oscillating sector 99 carried by a rock shaft 100 journaled in a bracket 101 secured to the framework.

102 denotes a link the ends of which are pivoted respectively to an arm 103 extending from rock shaft 100 and to a slide 104 which slides in a way 105 in bracket 55. The upper end of this slide is provided with a roller 106 which engages cam groove 34 in disk 33 on main shaft 28. When the gripper operating slide is at the extreme of its movement toward the left, the rollers 98 will be at the right end of cam slots 97 as shown in dotted lines in Fig. 5. In this position of the parts the end of gripper operating slide 96 is engaged by a lug 107 at one edge of the sector and is forced toward the right to open the grippers.

108 denotes an opening in the gripper operating slide. At the other extreme of movement of this slide from that described and at the proper moment for the grippers to be moved by springs 94 to the closed or gripping position, recess 108 in the gripper operating slide will be in position to be engaged by a lug 109 at the opposite edge of the sector, the effect of which will be to move the gripper operating slide toward the left as seen in Fig. 5, and through the action of the gripper slides and springs to cause the grippers to grip a blank or part.

The second female die, indicated by 43, is provided with springs 110, the free ends of which lie partially over the top of the die and under the scrap which is cut off from the blank by the action of the second male and female dies and which acts to lift the scrap slightly from the female die when the male die rises.

111 denotes fingers carried by the second way plate 74, that is, the way plate toward the right, as seen in Fig. 4, the action of which is, when said way plate is moved toward the left as will presently be described, to pick up the scrap that has been removed by the second male and female dies, carry it toward the left and deposit it upon a scrap carrying belt 112 which removes the scrap from the dies and permits it to drop off into a convenient receptacle.

113 denotes a part carrying belt at the right of the right way plate, as seen in Fig. 4, which carries off the completed parts after the action of the third male and female dies and permits them to drop off into a suitable receptacle. When the second way plate moves from its position toward the left to the position shown in Fig. 4, the outer ends of gripper fingers 89, push the completed parts off from the top of the third female die and upon the part carrying belt, said completed parts having previously been lifted out of the female die by plungers 57.

Carrying belts 112 and 113 pass over pulleys 114, 115 and 116, carried by shafts 120 journaled in brackets 117 secured to the framework and over driving pulleys 118, one only being shown, carried by a shaft 119 journaled in one of the brackets 117. Shaft 119 carries a sprocket wheel 121 and a sprocket chain 122 passes over said sprocket wheel and over a sprocket wheel 123 on shaft 24, sprocket wheel 123 appearing in dotted lines only. These sprocket wheels and the sprocket chain impart continuous movement to the carrying belts.

Figure 9:
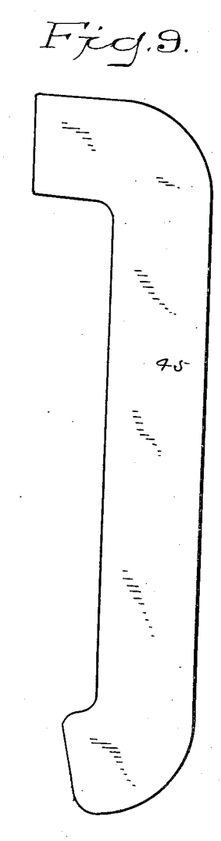
Fig. 9 a plan view of a blank for a lantern tube section.
Figure 10:
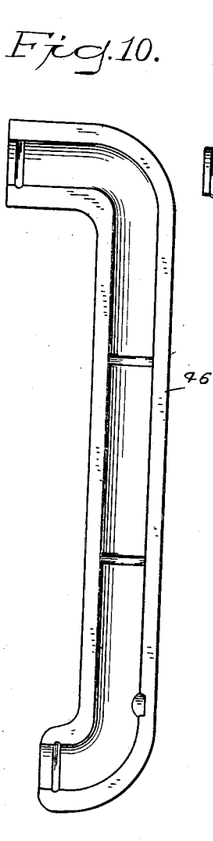
Fig. 10 a plan view of the blank after the operation of the first dies.
Figure 11:
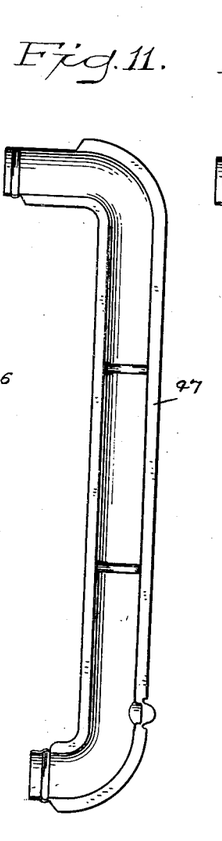
Fig. 11 a plan view of the blank after the operation of the second dies.
Figure 12:
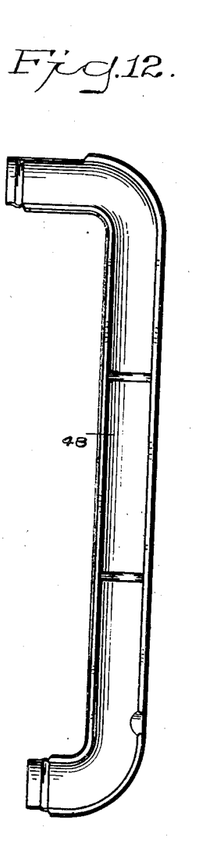
Fig. 12 is a plan view of a completed lantern tube section, that is, after the operation of the third dies.

The operation is as follows: The machine operates upon blanks 45 of tin plate or other sheet metal, blanks of the form shown in Fig. 9 being furnished to the present machine. Each blank is fed forward on receiving plate 49 by means of feed slide 50, the forward edge of which is shaped to correspond with the blank so that the blank can be fed forward in correct position only. The feed slide places the blank over the first female die 42 where it receives the impression of the first male die 39, the action of which is to produce the partly finished tube blank 46, as in Fig. 10. It will be understood of course that this machine is not limited to the making of any special form of part, and that the shape of the finished product of the machine is merely the shape imparted to it by the special male and female dies used. Tubular lantern tubes, for example, are each formed from two corresponding sections, and it necessarily follows that different sets of male and female dies must be employed to produce the corresponding sections of each tube. After the blank has been operated upon by the first male and female dies, the male die rises, an instant later standards 60 and tables 59 raise the plungers 57 and lift the partly or wholly formed parts from the female dies, it being understood of course that the action of the three pairs of dies is simultaneous. The action of the grippers in connection with the first set of dies is not illustrated in detail, but is identical with the action of the grippers in connection with the second and third set of dies, which is fully illustrated in Fig. 4. For convenience of description, we will call the set of grippers toward the left in Fig. 4 the first set, and the set toward the right the second set. Returning now to the first set of dies, when the male die rises the carrier and grippers will not be in the position shown in Fig. 4, which is at the extreme of their movement toward the right, but the carrier will be at the extreme of its movement toward the left and the first set of grippers will be over the first female die, the male die being raised out of the way, and the second set of grippers will be over the second female die, and the grippers will be at the open position, as in full lines in Fig. 5. When the plungers in the first female die raise the partly formed part out of the female die, it will lie between the open grippers. An instant later and while the carrier is stationary lug 109 will engage recess 108 in the sector and will move the gripper operating slide toward the left which in turn will operate the gripper slides and permit the springs to close the grippers upon the partly formed parts as they are lifted from the several female dies, the edges of the parts passing into the recesses 91 in the gripper fingers, which as already explained face each other, there being two upon one side of the part and one on the other. Identically the same operation of the grippers takes place simultaneously at the first and second sets of dies. The carrier and with it the way plates and grippers then move from the position just described but not shown in the drawings, to the position shown in Fig. 5, the grippers still remaining closed as indicated by dotted lines. An instant later lug 107 on the sector engages the gripper operating slide and moves said slide toward the right, the effect of which is to open the grippers through the action of inclines 93 on rollers 92, as in full lines in Fig. 5. This releases the partly formed parts, leaving them in position over the second and third female dies. The carrier, way plates and grippers then move toward the left and the male dies descend and coact with the female dies in performing the second and third operations upon the partly formed parts. As already stated the second set of dies removes a strip of scrap from the partly formed part. This strip of scrap is prevented from adhering to the female die by the action of springs 110, and when the carrier and way plates move toward the left fingers 111 upon the second way plate pick up the strip of scrap and deposit it upon scrap carrying belt 112 which carries it away and drops it into a convenient receptacle. When the carrier and way plates move toward the right the right gripper fingers in the second set push the part 48 which has been completed by the action of the third pair of dies off from the third female die and upon carrying belt 113 which removes it and permits it to drop into a convenient receptacle.

Having thus described our invention, we claim:

1. In a machine of the character described, the combination with a plurality of pairs of dies and a plurality of sets of grippers, of mechanism for opening and closing the grippers, mechanism for moving the grippers from one pair of dies to another, springs for raising scrap from a female die and fingers for carrying the scrap from said die.

2. In a machine of the character described, the combination with a plurality of pairs of dies and a plurality of sets of grippers, of mechanism for opening and closing the grippers, mechanism for moving the grippers from one pair of dies to another, springs for raising the scrap from a female die, fingers for removing it and a scrap carrying belt upon which it is placed by the fingers.

3. In a machine of the character described, the combination with a plurality of pairs of dies and a plurality of sets of grippers having rollers, of gripper slides having inclines engaging the rollers by which the grippers are opened, springs by which they are closed and mechanism for moving the grippers from one pair of dies to another.

4. In a machine of the character described, the combination of a plurality of pairs of dies and a plurality of sets of grippers, of a reciprocating carrier, way plates carried thereby in which the grippers reciprocate transversely and gripper slides in the way plates by which the grippers are actuated.

5. In a machine of the character described, the combination with a plurality of pairs of dies and a plurality of sets of grippers, of a reciprocating carrier, way plates carried thereby in which the grippers reciprocate transversely, rollers on the grippers, and gripper slides in the way plates having inclines by which the grippers are actuated.

6. In a machine of the character described, the combination with a plurality of pairs of dies and a plurality of sets of grippers, of a reciprocating carrier, way plates carried thereby in which the grippers reciprocate transversely, gripper slides in the way plates by which the grippers are actuated and a gripper operating slide reciprocating longitudinally to the carrier and transversely to the gripper slides by which the latter are actuated.

7. In a machine of the character described, the combination with a plurality of pairs of dies and a plurality of sets of grippers, of a reciprocating carrier, way plates carried thereby in which the grippers reciprocate transversely, gripper slides in the way plates by which the grippers are actuated and which are provided with rollers and a gripper operating slide having cam slots engaged by the rollers.

8. In a machine of the character described, the combination with a plurality of pairs of dies and a plurality of sets of grippers, of a reciprocating carrier by which the grippers are carried, a gripper operating slide and intermediate connections by which the grippers are operated and an oscillating sector by which the gripper operating slide is engaged at the extreme of its movement to open or close the grippers.

9. In a machine of the character described, the combination with a plurality of pairs of dies and a plurality of sets of grippers, of a reciprocating carrier by which the grippers are carried, a gripper operating slide having an opening, connections intermediate the operating slide and the grippers by which the latter are operated and an oscillating sector having lugs one of which engages the gripper operating slide when the carrier is at one extreme of its movement to actuate said operating slide, the other lug engaging the opening when the carrier is at the other extreme of its movement to actuate said operating slide in the other direction.

10. In a machine of the character described, the combination with a plurality of pairs of dies and a plurality of sets of grippers, of a reciprocating carrier, way plates carried thereby in which the grippers reciprocate and a slide for actuating the grippers at predetermined times.

11. In a machine of the character described, the combination with a plurality of pairs of dies and a plurality of sets of grippers, of a reciprocating carrier, way plates carried thereby in which the grippers reciprocate, gripper slides by which the grippers are actuated and a gripper operating slide by which the gripper slides are actuated.

12. In a machine of the character described, the combination with a plurality of pairs of dies, a reciprocating carrier and way plates thereon, of fingers upon one of the way plates for removing scrap from a female die after the male die rises.

13. In a machine of the character described, the combination with a plurality of pairs of dies, a reciprocating carrier and way plates thereon, of fingers upon one of the way plates for removing scrap from a female die after the male die rises and a carrying belt upon which the scrap is deposited by the fingers.

14. In a machine of the character described, the combination with a plurality of pairs of dies, a reciprocating carrier and way plates thereon, of springs for raising scrap from a female die, fingers upon one of the way plates for removing the scrap and a carrying belt upon which the scrap is deposited by fingers.

15. In a machine of the character described, the combination with a plurality of pairs of dies and a plurality of sets of grippers, of a reciprocating carrier by which the grippers are carried and a carrying belt contiguous to the last set of dies, the movement of the grippers in one direction carrying the finished parts from the die to the belt.

16. In a machine of the character described, the combination with a plurality of pairs of dies and a plurality of sets of grippers, of plungers for lifting the parts operated upon from the female dies when the male dies rise, a reciprocating carrier by which the grippers are carried and a carrying belt upon which the parts operated upon by the last die are moved by the outer ends of the grippers.

17. In a machine of the character described, the combination with a plurality of pairs of dies and a plurality of sets of grippers, of a feed slide for moving blanks to the first dies, mechanism for raising the parts from the female dies after being operated upon, mechanism for closing the grippers upon the parts when raised from the dies and mechanism for moving the grippers from one pair of dies to another.

18. In a machine of the character described, the combination with a plurality of pairs of dies and a plurality of sets of grippers, of a reciprocating carrier by which the grippers are carried, mechanism for closing the grippers upon the parts at one extreme of movement of the carrier and mechanism for opening the grippers at the other extreme of movement of the carrier.

19. In a machine of the character described, the combination with a plurality of pairs of dies and a plurality of sets of grippers, of a reciprocating carrier by which the grippers are carried, mechanism for raising the parts from the female dies after being operated upon, mechanism for closing the grippers upon the parts and mechanism for opening the grippers when the carrier has moved them to the next pair of dies.

20. In a machine of the character described, the combination with a plurality of pairs of dies and a plurality of sets of grippers, of a reciprocating carrier, a carrying plate upon which the carrier slides, way plates upon the carrier in which the grippers slide transversely, a carrier operating slide reciprocating in the carrying plate and intermediate connections by which the grippers are operated.

21. In a machine of the character described, the combination with a plurality of pairs of dies and a plurality of sets of grippers, of a reciprocating carrier, a carrying plate upon which the carrier slides, way plates upon the carrier, carrier slides in the way plates by which the grippers are operated, and a carrier operating slide reciprocating in the carrying plate by which the grippers are operated.

22. In a machine of the character described, the combination with a plurality of pairs of dies and a plurality of sets of grippers, of a reciprocating carrier by which the grippers are carried, a driving slide in the carrier, means for adjusting said slide relatively to the carrier and means for actuating the grippers while the carrier is stationary at the extremes of its movement.

23. In a machine of the character described, the combination with a female die and a plurality of vertically movable plungers in said die, for the purpose set forth, of a table upon which said plungers rest, a vertically movable standard by which the table is carried, a rock shaft having an arm provided with a rest and a set screw in said rest engaging the lower end of the standard to determine the movement of the plungers.

24. In a machine of the character described, the combination with a plurality of pairs of dies and a plurality of sets of grippers, of a reciprocating carrier by which the grippers are carried, a gripper operating slide by which the grippers are operated and an oscillating sector engaging the gripper operating slide to actuate said slide when the carrier is stationary at each end of its reciprocation.

In testimony whereof we affix our signatures in presence of two witnesses.

AXEL H. NILSON.
MAURITZ OLSON.

Witnesses:
 A. M. WOOSTER,
 S. W. ATHERTON.